(12) United States Patent
Yue et al.

(10) Patent No.: US 10,554,305 B2
(45) Date of Patent: Feb. 4, 2020

(54) METHODS AND APPARATUS FOR LOW-LOSS RECONFIGURABLE OPTICAL QUADRATURE AMPLITUDE MODULATION (QAM) SIGNAL GENERATION

(71) Applicant: Juniper Networks, Inc., Sunnyvale, CA (US)

(72) Inventors: Yang Yue, Milpitas, CA (US); Bo Zhang, San Jose, CA (US); Qiang Wang, San Carlos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/440,693

(22) Filed: Jun. 13, 2019

(65) Prior Publication Data

US 2019/0312647 A1 Oct. 10, 2019

Related U.S. Application Data

(62) Division of application No. 15/255,078, filed on Sep. 1, 2016, now Pat. No. 10,367,586.

(51) Int. Cl.
*H04B 10/04* (2006.01)
*H04B 10/54* (2013.01)
(Continued)

(52) U.S. Cl.
CPC ....... *H04B 10/541* (2013.01); *H04B 10/5053* (2013.01); *H04B 10/564* (2013.01)

(58) Field of Classification Search
CPC . H04B 10/541; H04B 10/5053; H04B 10/564
(Continued)

(56) References Cited

U.S. PATENT DOCUMENTS

| 2007/0292143 A1* | 12/2007 | Yu ............... H04B 10/25754 398/188 |
| 2011/0051215 A1* | 3/2011 | Zhou ............... H04B 10/505 359/238 |
| 2014/0126913 A1* | 5/2014 | Nakamoto ......... H04B 10/5051 398/115 |

FOREIGN PATENT DOCUMENTS

| CN | 101626274 A | 1/2010 |
| CN | 101997608 A | 3/2011 |
| CN | 102647392 A | 8/2012 |

OTHER PUBLICATIONS

First Office Action for Chinese Application No. 201611259502.1, dated Aug. 19, 2019, 13 pages.

* cited by examiner

*Primary Examiner* — Mohammad R Sedighian
(74) *Attorney, Agent, or Firm* — Cooley LLP

(57) ABSTRACT

In some embodiments, an apparatus includes a quadrature amplitude modulation (QAM) optical modulator which includes a first phase modulator (PM), a second PM, a tunable optical coupler (TOC), and an optical combiner (OC). The TOC is configured to split a light wave at an adjustable power splitting ratio to produce a first split light wave and a second split light wave. The first PM is configured to modulate the first split light wave in response to a first multi-level electrical signal to produce a first modulated light wave. The second PM is configured to modulate the second split light wave in response to a second multi-level electrical signal to produce a second modulated light wave. The OC is then configured to combine the first modulated light wave and the second modulated light wave to generate a QAM optical signal.

20 Claims, 8 Drawing Sheets
(3 of 8 Drawing Sheet(s) Filed in Color)

(51) Int. Cl.
*H04B 10/50* (2013.01)
*H04B 10/564* (2013.01)
(58) Field of Classification Search
USPC .................................................. 398/115, 188
See application file for complete search history.

800

| 802 | Receive an optical signal, and split the optical signal according to a first power splitting ratio to produce a first split optical signal and a second split optical signal. |

| 804 | Modulate the first split optical signal to cover a first plurality of constellation points to produce a first modulated optical signal. |

| 806 | Modulate the second split optical signal to cover a second plurality of constellation points to produce a second modulated optical signal. |

| 808 | Combine the first modulated optical signal and the second modulated optical signal at a second power coupling ratio to produce an output modulated QAM optical signal. |

902 — Receive an optical signal, and split the optical signal to produce a set of split optical signals.

904 — Modulate each split optical signal of the set of split optical signals in response to a multi-level electrical driving signal to produce a set of modulated optical signals.

906 — Combine the set of modulated optical signals to produce an output modulated QAM optical signal.

METHODS AND APPARATUS FOR LOW-LOSS RECONFIGURABLE OPTICAL QUADRATURE AMPLITUDE MODULATION (QAM) SIGNAL GENERATION

CROSS-REFERENCE TO RELATED APPLICATION

This application is a Division of U.S. patent application Ser. No. 15/255,078, now U.S. Pat. No. 10,367,586, filed Sep. 1, 2016, and entitled "Methods and Apparatus for Low-Loss Reconfigurable Optical Quadrature Amplitude Modulation (QAM) Signal Generation", the disclosure of which is incorporated herein by reference in its entirety.

BACKGROUND

Some embodiments described herein relate generally to methods and apparatus for optical quadrature amplitude modulation (QAM) signal generation. In particular, but not by way of limitation, some embodiments described herein relate to methods and apparatus for low-loss reconfigurable optical QAM signal generation.

With a growing demand of optical communication systems with high data rates capability, optical quadrature amplitude modulation (QAM) signals are generated to provide high data-carrying capacity and high spectral efficiency. Higher-order QAM signals are currently generated by using electronic circuits to drive in-phase and quadrature (IQ) optical modulators. These approaches, however, present challenges such as the need for expensive digital-to-analog converters (DAC), high modulation loss of a typical IQ modulator, inefficient use of the non-linear region of the modulator transfer function, and a lack of reconfigurability of the QAM signals.

Accordingly, a need exists for improved and simplified methods and apparatus to achieve low-loss reconfigurable optical QAM signal generation.

SUMMARY

In some embodiments, an apparatus includes a quadrature amplitude modulation (QAM) optical modulator, which includes a first phase modulator, a second phase modulator, a tunable optical coupler, and an optical combiner. Each of the first phase modulator and the second phase modulator is operatively coupled to the tunable optical coupler and the optical combiner. The tunable optical coupler is configured to split a light wave at an adjustable power splitting ratio to produce a first split light wave and a second split light wave. The first phase modulator is configured to modulate the first split light wave in response to a first multi-level electrical signal to produce a first modulated light wave. The second phase modulator is configured to modulate the second split light wave in response to a second multi-level electrical signal to produce a second modulated light wave. The optical combiner is then configured to combine the first modulated light wave and the second modulated light wave to generate a QAM optical signal.

In some embodiments, an apparatus includes a quadrature amplitude modulation (QAM) optical modulator, which includes an optical splitter, a first phase modulator, a second phase modulator, and an optical combiner. The optical splitter, having a first output and a second output, is configured to receive an optical signal and split the optical signal according to a first power splitting ratio. The first phase modulator, operatively coupled to the first output of the optical splitter, is configured to receive a first split optical signal from the first output and modulate the first split optical signal to produce a first modulated optical signal such that the first modulated optical signal is represented within a constellation diagram as covering a first plurality of constellation points on a circle. The second phase modulator, operatively coupled to the second output of the optical splitter, is configured to receive a second split optical signal from the second output of the optical splitter and modulate the second split optical signal to produce a second modulated optical signal such that the second modulated optical signal is represented within the constellation diagram as starting from a point on the circle and covering a second plurality of constellation points. The first plurality of constellation points and the second plurality of constellation points represent all constellation points of a QAM optical signal. The optical combiner, operatively coupled to the first phase modulator and the second phase modulator at a second power coupling ratio, is configured to combine the first modulated optical signal and the second modulated optical signal to produce an output modulated QAM optical signal.

In some embodiments, an apparatus includes a parallel quadrature amplitude modulation (QAM) optical modulator, which includes a first tunable optical coupler (TOC), a second TOC, a first phase modulator (PM), a second PM, a third PM, a first optical combiner (OC), and a second optical combiner (OC). The first TOC, having a first output and a second output, is configured to split an optical signal. The first PM is operatively coupled to the first output of the first TOC and a first input of the first OC. The second TOC, having a first output and a second output, is operatively coupled to the second output of the first TOC. The second PM is operatively coupled to the first output of the second TOC and a first input of the second OC. The third PM is operatively coupled to the second output of the second TOC and a second input of the second OC. An output of the second OC is coupled to a second input of the first OC. The first OC is configured to output a modulated QAM optical signal.

In some embodiments, an apparatus includes a serial quadrature amplitude modulation (QAM) optical modulator including a first phase modulator (PM), a first tunable optical coupler (TOC), a second PM, a second TOC, a third PM, a first optical combiner (OC), and a second optical combiner (OC). The first PM, operatively coupled to an input of the first TOC, is configured to receive an input optical signal. The first TOC has a first output operatively coupled to the second PM and a second output operatively coupled to the first OC. The second PM is operatively coupled to an input of the second TOC. The second TOC has a first output operatively coupled to the third PM and a second output operatively coupled to the second OC. The third PM is operatively coupled to an input of the second OC and an output of the second OC is coupled to a first input of the first OC. The first OC is configured to output a modulated QAM optical signal.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 is a flow chart illustrating a method of generating a QAM optical signal with a QAM optical modulator having two phase modulators, according to an embodiment.

FIG. 9 is a flow chart illustrating a method of generating a QAM signal with a parallel or serial QAM optical modulator having more than two phase modulators, according to an embodiment.

DETAILED DESCRIPTION

Figure 1:
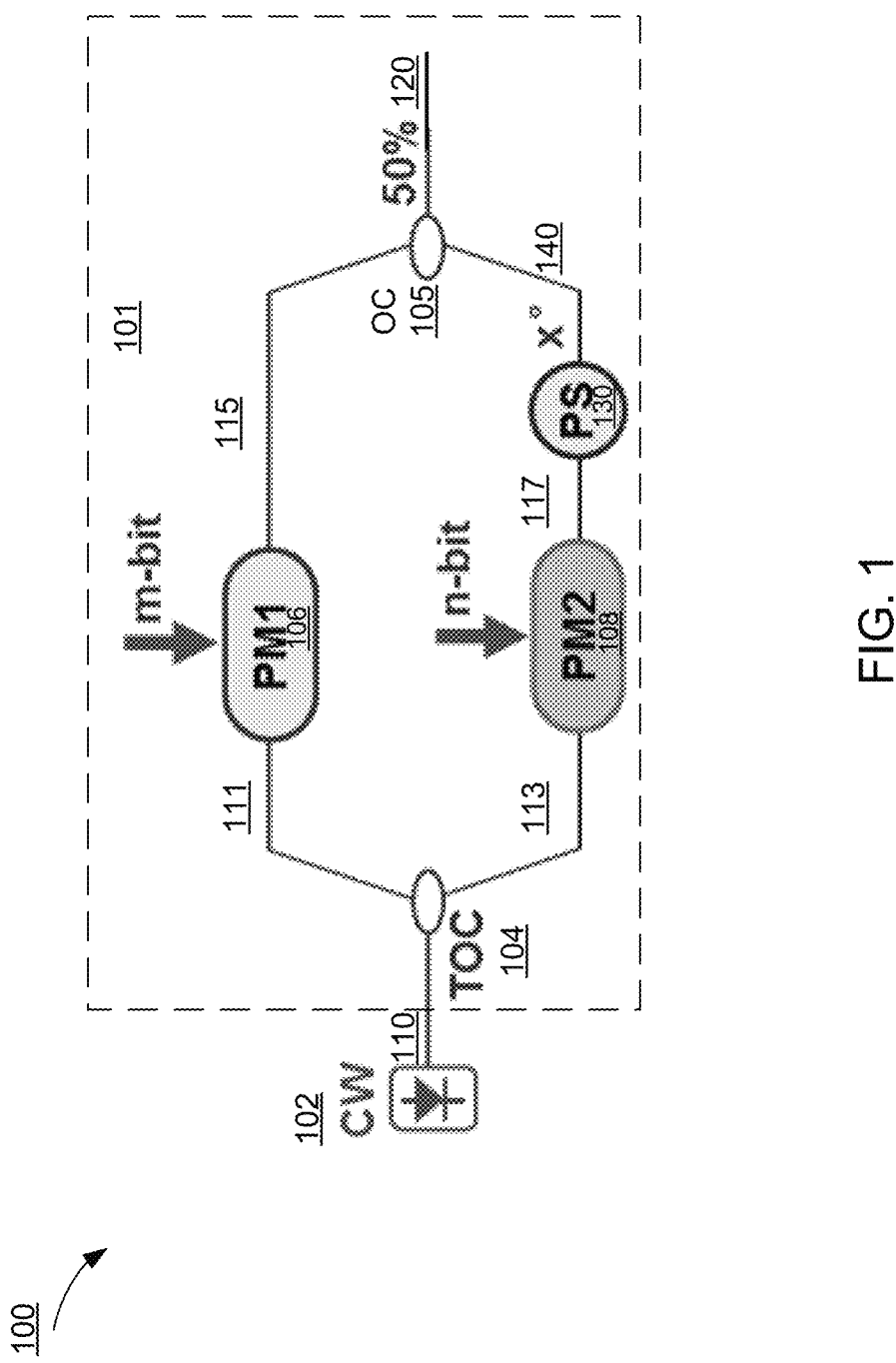
FIG. 1 is a block diagram illustrating a quadrature amplitude modulation (QAM) optical modulator, according to an embodiment.

In some embodiments, an apparatus includes a quadrature amplitude modulation (QAM) optical modulator which includes a first phase modulator, a second phase modulator, a tunable optical coupler, and an optical combiner. Each of the first phase modulator and the second phase modulator is operatively coupled to the tunable optical coupler and the optical combiner. The tunable optical coupler is configured to split a light wave at an adjustable power splitting ratio to produce a first split light wave and a second split light wave. The first phase modulator is configured to modulate the first split light wave in response to a first multi-level electrical signal to produce a first modulated light wave. The second phase modulator is configured to modulate the second split light wave in response to a second multi-level electrical signal to produce a second modulated light wave. The optical combiner is then configured to combine the first modulated light wave and the second modulated light wave to generate a QAM optical signal.

In some embodiments, an apparatus includes a quadrature amplitude modulation (QAM) optical modulator which includes an optical splitter, a first phase modulator, a second phase modulator, and an optical combiner. The optical splitter, having a first output and a second output, is configured to receive an optical signal and split the optical signal according to a first power splitting ratio. The first phase modulator, operatively coupled to the first output of the optical splitter, is configured to receive a first split optical signal from the first output and modulate the first split optical signal to produce a first modulated optical signal such that the first modulated optical signal is represented within a constellation diagram as covering a first plurality of constellation points on a circle. The second phase modulator, operatively coupled to the second output of the optical splitter, is configured to receive a second split optical signal from the second output of the optical splitter and modulate the second split optical signal to produce a second modulated optical signal such that the second modulated optical signal is represented within the constellation diagram as starting from a point on the circle and covering a second plurality of constellation points. The first plurality of constellation points and the second plurality of constellation points represent all constellation points of a QAM optical signal. The optical combiner, operatively coupled to the first phase modulator and the second phase modulator at a second power coupling ratio, is configured to combine the first modulated optical signal and the second modulated optical signal to produce an output modulated QAM optical signal.

In some embodiments, an apparatus includes a parallel quadrature amplitude modulation (QAM) optical modulator which includes a first tunable optical coupler (TOC), a second TOC, a first phase modulator (PM), a second PM, a third PM, a first optical combiner (OC), and a second optical combiner (OC). The first TOC, having a first output and a second output, is configured to split an optical signal. The first PM is operatively coupled to the first output of the first TOC and a first input of the first OC. The second TOC, having a first output and a second output, is operatively coupled to the second output of the first TOC. The second PM is operatively coupled to the first output of the second TOC and a first input of the second OC. The third PM is operatively coupled to the second output of the second TOC and a second input of the second OC. An output of the second OC is coupled to a second input of the first OC. The first OC is configured to output a modulated QAM optical signal.

In some embodiments, an apparatus includes a serial quadrature amplitude modulation (QAM) optical modulator including a first phase modulator (PM), a first tunable optical coupler (TOC), a second PM, a second TOC, a third PM, a first optical combiner (OC), and a second optical combiner (OC). The first PM, operatively coupled to an input of the first TOC, is configured to receive an input optical signal. The first TOC has a first output operatively coupled to the second PM and a second output operatively coupled to the first OC. The second PM is operatively coupled to an input of the second TOC. The second TOC has a first output operatively coupled to the third PM and a second output operatively coupled to the second OC. The third PM is operatively coupled to an input of the second OC and an output of the second OC is coupled to a first input of the first OC. The first OC is configured to output a modulated QAM optical signal.

In some embodiments, an apparatus includes a quadrature amplitude modulation (QAM) optical modulator to generate a QAM optical signal. The QAM optical modulator can be configured to include two phase modulators (PM), a tunable optical coupler (TOC), and an optical combiner (OC). Each of the two PMs can be operatively coupled to the TOC and the OC. When the QAM optical modulator is operatively coupled to an optical source that emits an optical signal, the TOC can split the optical signal, according to a power splitting ratio, to produce a first split optical signal and a second split optical signal. The power splitting ratio can be fixed or dynamically adjusted during a design process, a manufacturing process, a reconfiguration process, a troubleshoot process, or in operation of the QAM optical modulator. Each of the PMs can modulate the first split optical signal and the second split optical signal respectively to produce a first modulated optical signal and a second modulated optical signal. The OC can then combine the first modulated optical signal and the second modulated optical signal, according to a power coupling ratio, to produce the QAM optical signal. Similarly, the power coupling ratio can be fixed or dynamically adjusted during a design process, a manufacturing process, a reconfiguration process, a troubleshoot process, or in operation of the QAM optical modulator. Unlike a typical QAM in-phase/quadrature (I/Q) modulator, which performs intensity modulation, the QAM optical modulator described herein can perform phase only modulation, in some embodiments. Thus, the two phase modulators of the QAM optical modulator cover constellation points on circles. Compared with the typical QAM I/Q modulator, the QAM optical modulator described herein greatly reduces modulation loss and provides more reconfigurability.

As used in this specification, the singular forms "a," "an" and "the" include plural referents unless the context clearly dictates otherwise. Thus, for example, the term "an optical modulator" is intended to mean a single optical modulator or multiple optical modulators. For another example, the term "a phase modulator" is intended to mean a single phase modulator or multiple phase modulators.

FIG. 1 is a block diagram illustrating an optical signal transmission apparatus, according to an embodiment. In some embodiments, the optical signal transmission apparatus 100 includes an optical source 102 and a quadrature amplitude modulation (QAM) optical modulator 101 operatively coupled to the optical source 102. The optical source 102 can be, for example, a laser diode emitting an optical signal (or light wave) 110 in a continuous waveform (CW). The optical source 102 outputs the optical signal 110 to the QAM optical modulator 101, which can modulate the optical signal 110 to output a QAM optical signal 120 for transmission in an optical communication system (not shown in FIG. 1). The QAM optical signal 120 is modulated in a way that can be represented as one of $2^i$ constellation points. Details of the representation of $2^i$ constellation points are discussed below with regards to FIGS. 2A-2B.

In some embodiments, the QAM optical modulator 101 includes a first phase modulator (PM1) 106, a second phase modulator (PM2) 108, a first tunable optical coupler (TOC) 104, an optical combiner (OC) 105, and an optical phase shifter (PS) 130. Each of the PM1 106 and the PM2 108 is operatively coupled to the TOC 104 and the OC 110. The TOC 104 is operatively coupled to the output of the optical source 102 and has a first output 111 and a second output 113. The TOC 104 can split (or divide) the optical signal 110 received from the optical source 102 between the first output 111 and the second output 113 to produce a first split optical signal and a second split optical signal. In some embodiments, the TOC 104 can split the optical signal 110 between the first output 111 and the second output 113 at an adjustable (or tunable) power splitting ratio. For example, the TOC 104 can split the optical signal 110 such that the first split optical signal at output 111 has an optical power of 40% of the optical signal 110, and the second split optical signal at output 113 has an optical power of 60% of the optical signal 110. In other embodiments, the TOC 104 can split the optical signal 110 equally such that each of the first split optical signal and the second split optical signal has a power of 50% of the optical signal 110. In some embodiments, the TOC 104 (or an external controller not shown in FIG. 1) can dynamically adjust (or reconfigure) the power splitting ratio, at any given time when in manufacture or when in operation, to any ratio between 0 to 100%. In other embodiments, the power splitting ratio is fixed.

Each of the phase modulators, PM1 106 and PM2 108, can be driven by a respective electrical signal (labeled in FIG. 1 "m-bit" and "n-bit") and can modulate an optical signal by varying the instantaneous phase of the optical signal. Specifically, PM1 106 receives the first split optical signal 111 as an input to the PM1 106. PM1 106 then modulates the first split optical signal 111 by applying a first electrical signal ("m-bit") and outputs a first modulated optical signal 115 to the optical combiner (OC) 105. Similarly, PM2 108 receives the second split optical signal 113 as an input to the PM2 108. PM2 108 then modulates the second split optical signal 113 by applying a second electrical signal ("n-bit") to output a second modulated optical signal 117 to the OC 105.

In some embodiments, the first electrical signal and the second electrical signal applied to the phase modulators, PM1 106 and PM2 108 respectively, can be generated by a respective digital-to-analog converter (DAC, not shown in FIG. 1). A first DAC (not shown in FIG. 1) operatively coupled to PM1 106 can be a 1-bit or multi-bit (or m-bit) DAC (e.g., 2-bit, 4-bit, 8-bit, 16-bit). A second DAC (not shown in FIG. 1) operatively coupled to PM2 108 can also be a 1-bit or multi-bit (or n-bit) DAC (e.g., 2-bit, 4-bit, 8-bit, 16-bit). A multi-bit DAC can generate a multi-level electrical signal to be applied to one of the PM1 106 and PM2 108. The number of bits of the first DAC can be the same as or different from the number of bits of the second DAC. In some embodiments, the numbers of bits of the first DAC and the second DAC can be selected (or reconfigured), during a design process, a manufacturing process, a reconfiguration process, a troubleshoot process, or in operation, to adjust (or optimize) coverage on a constellation diagram of the modulated QAM optical signal 120. Details of such embodiments are discussed below with regards to FIGS. 4-6.

In some embodiments, a phase shifter (PS) 130 can be optionally coupled to PM2 108 and the OC 105. Specifically, PS 130 receives the second modulated optical signal 117 from PM2 108 and applies a phase shift or rotation to the second modulated optical signal 117 to produce a third modulated optical signal 140. PS 130, driven by a control signal (not shown in FIG. 1), can cause a phase offset between the first modulated optical signal 115 and the third modulated optical signal 140. In some implementations, the degree of the phase offset can be adjusted (or reconfigured) dynamically to any number between 0 and 90 degrees. In some implementations as shown in FIG. 1, PS 130 is operatively coupled to the output of PM2 108 and the output of PS 130 is operatively coupled to the input of OC 105. In other implementations, PS 130 can be positioned before or after each of PM1 106 and PM2 108. For example, the PS can be operatively coupled to the output of the TOC 104 and the output of the PS can be operatively coupled to the input of PM2 108. As discussed earlier, PS 130 is optional and thus in some embodiments, the QAM optical modulator 101 does not include a phase shifter 130.

The optical combiner (OC) 105 can be operatively coupled to the output 115 of PM1 106 and the output 117 of PM2 108. In the implementation where the optional PS 130 is used, the OC 105 can be operatively coupled to the output 115 of PM1 106 and the third modulated optical signal 140 and has an output 120. OC 105 can combine the first modulated optical signal 115 and the second modulated optical signal 117 (or the third modulated optical signal 140 if the optional PS 130 is used) to output a QAM optical signal 120. In some implementations, the OC 105 can combine the first modulated optical signal 115 and the second modulated optical signal 117 (or the third modulated optical signal 140 if the optional PS is used) at an adjustable (or tunable) power coupling ratio. For example, the OC 105 can combine the first modulated optical signal 115 and the second modulated optical signal 117 such that the first modulated optical signal 115 has an optical power of 60% of the output QAM optical signal 120, and the second modulated optical signal 117 has an optical power of 40% of the output QAM optical signal 120. In other implementations, the OC 105 can combine the first modulated optical signal 115 and the second modulated optical signal 117 such that each of the first modulated optical signal 115 and the second modulated optical signal 117 has a power ratio of 50% of the output QAM optical signal 120. In some implementations, the OC 105 (or an external controller not shown in FIG. 1) can dynamically adjust (or reconfigure) the power coupling ratio to any ratio between 0 to 100%. In other implementations, the power coupling ratio is fixed. In some implementations, the power coupling ratio of the OC 105 can be the same as the power splitting ratio of the TOC 104. In other implementations, the power coupling ratio of the OC 105 can be different (or unbalanced) from the power splitting ratio of the TOC 104.

Figure 2B:
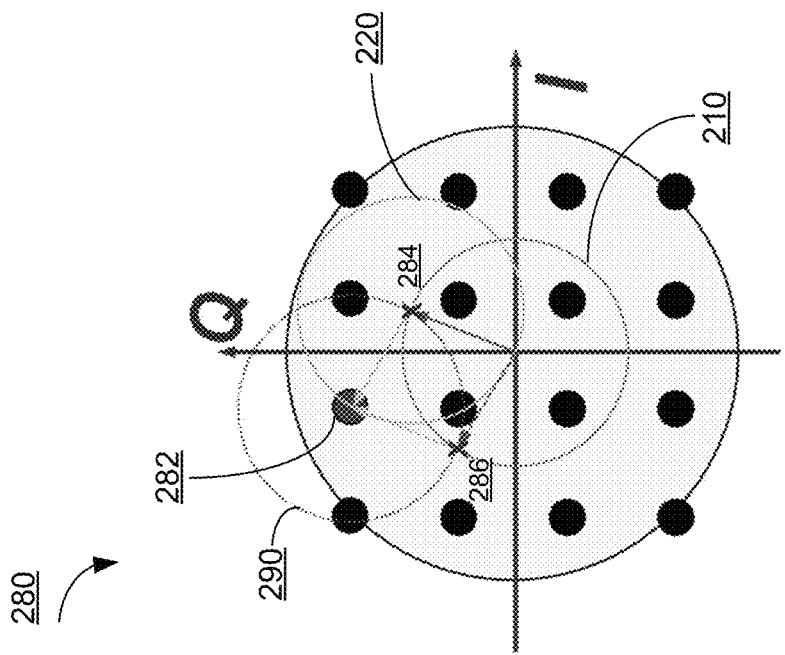
FIGS. 2A-2B are constellation diagrams of a 16-QAM optical signal generated by a QAM optical modulator, according to an embodiment.
Figure 2A:
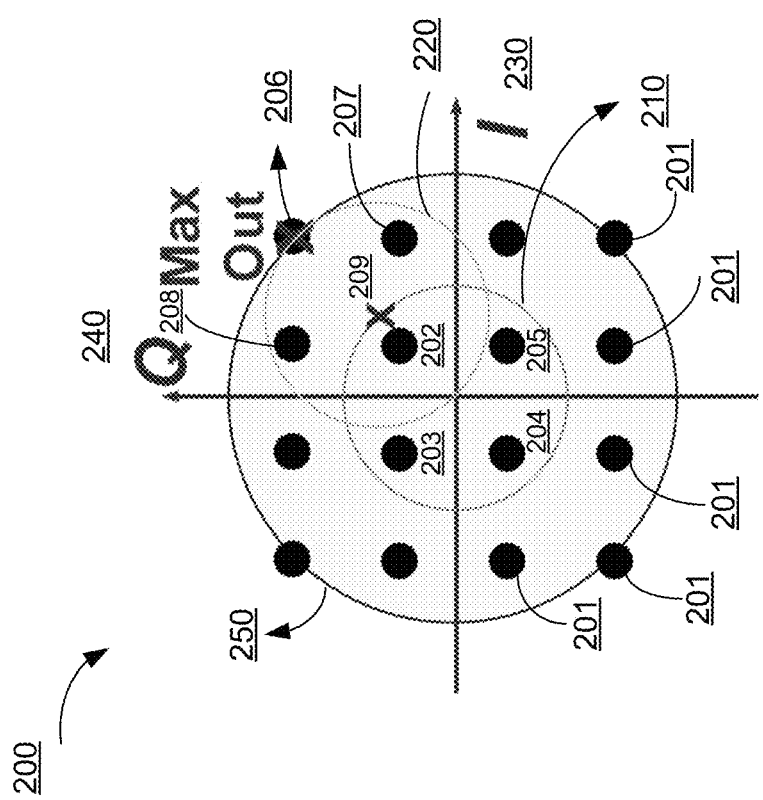

FIGS. 2A-2B are constellation diagrams of a 16-QAM optical signal generated by the QAM optical modulator 101, according to an embodiment. FIG. 2A is a constellation diagram 200 representing a 16-QAM optical signal generated by a QAM optical modulator, such as the QAM optical modulator 101 discussed above with regards to FIG. 1. As discussed above in connection with FIG. 1, PM1 106 modulates an optical signal to produce a first modulated optical signal 115 and PM2 108 modulates an optical signal to produce a second modulated optical signal 117. The QAM optical modulator 101 outputs a QAM optical signal 120. When the QAM optical signal 120 is a 16-QAM optical signal, the 16 constellation points can be represented by the black dots (201-208) in the shaded region 250, as shown in FIG. 2A.

The horizontal axis 230 of the constellation diagram 200 represents an in-phase (I) component of the 16-QAM optical signal, and the vertical axis 240 of the constellation diagram 200 represents a quadrature (Q) component of the 16-QAM optical signal. In some embodiments, the QAM optical modulator 101 described with regards to FIG. 1 performs phase only modulation. Thus, the first phase modulator, PM1 106 in FIG. 1, can cover any point on circle 210 including the four constellation points (e.g., 202, 203, 204, and 205). The second phase modulator, PM2 108 in FIG. 1, can start from anywhere on circle 210. For example, if PM2 108 starts from cross point 209 on circle 210, PM2 108 can cover any point on circle 220 after a vector addition with the first modulated optical signal 115 from PM1 106. As PM2 108 can start from any point on circle 210, it can cover all the points within the shaded region 250. In some embodiments, the QAM signals do not occupy the region close to the center point in the constellation diagram. In some embodiments, the power splitting ratio from, for example, TOC 104 in FIG. 1, can be adjusted away from 50:50, to adjust the density of the coverage area inside the shaded region 250 with finite DAC number.

A typical QAM in-phase/quadrature (I/Q) modulator includes an I-arm for in-phase (I) intensity modulation and a Q-arm for quadrature (Q) intensity modulation. When generating a 16-QAM signal using the typical QAM optical modulator, for example, the I-arm modulator covers four constellation points horizontally along the I-axis of the constellation diagram, and the Q-arm modulator covers four constellation points vertically along the Q-axis of the constellation diagram. Each of the I-arm modulator and the Q-arm modulator is typically driven by an independent four-level electrical signal. Unlike the typical QAM in-phase/quadrature (I/Q) modulator, which performs intensity modulation, the QAM optical modulator 101 described above with regards to FIG. 1 performs phase only modulation, in some embodiments. Thus, instead of covering constellation points horizontally along the I-axis by the I-arm modulator and vertically along the Q-axis by the Q-arm modulator of the typical QAM I/Q modulator, the two phase modulators (PM1 106 and PM2 108) of the QAM optical modulator 101 cover constellation points on circles (e.g., circle 210 and circle 220 in FIG. 2A). Modulation loss is greatly reduced with the QAM optical modulator 101, compared with the typical QAM I/Q modulator.

Furthermore, the typical QAM I/Q modulator uses only a relatively linear region of the modulator transfer function, which results in non-uniformity of the constellation points of the constellation diagram and further increases modulation loss. In contrast, the QAM optical modulator 101 described above with regards to FIG. 1 can use a broader region of the modulator transfer function, including the linear region that the typical QAM I/Q modulator uses and the non-linear region. Such efficient use of the modulator transfer function of the QAM optical modulator 101 can further reduce the modulation loss.

FIG. 2B is a constellation diagram of a 16-QAM optical signal generated by the QAM optical modulator 101, according to an embodiment. In some embodiments, the constellation diagram, as shown in FIG. 2B, can be used to reversely determine modulation instructions of two phase modulators (e.g., PM1 106 and PM2 108 in FIG. 1) of a QAM optical modulator (e.g., 101 in FIG. 1). Specifically, for example, if a constellation point 282 needs to be generated by the QAM optical modulator, a circle 290 covered by the second phase modulator (e.g., PM2 in FIG. 1) with a center point 282 can be determined. Based on the circle 210 covered by a first phase modulator (e.g., PM1 in FIG. 1), two cross points 284 and 286 can be determined. The configuration instructions for the second PM can be determined based on a circle with a center point 284 and a circle with a center point of 286.

Figure 3:
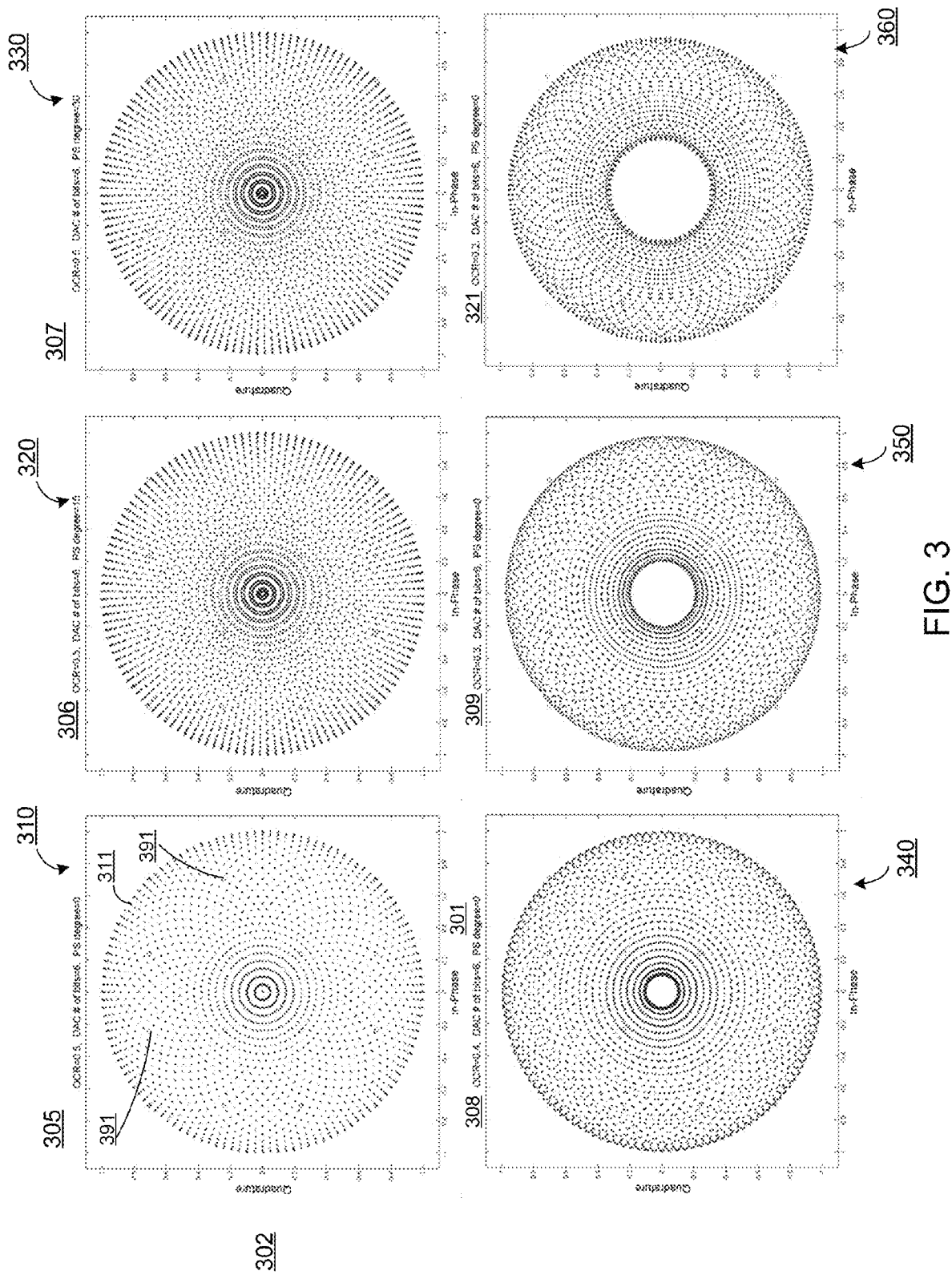
FIG. 3 illustrates constellation diagrams of a 16-QAM optical signal based on simulations of output generated by a QAM optical modulator, according to an embodiment.

FIG. 3 illustrates constellation diagrams of a 16-QAM optical signal based on simulations of output generated by a QAM optical modulator, according to an embodiment. Each of the six constellation diagrams, 310-360, is a simulated constellation diagram of a 16-QAM optical signal generated by a configuration of a QAM optical modulator (such as the QAM optical modulator described with respect to FIG. 1). The horizontal axis (e.g., 301 in diagram 310) of each constellation diagram (e.g., 310) represents an in-phase (I) component of the 16-QAM optical signal, and the vertical axis (e.g., 302 in diagram 310) of the constellation diagram (e.g., 310) represents a quadrature (Q) component of the 16-QAM optical signal. The blue dots (e.g., 311) on each diagram (e.g., 310) represent simulated constellation points covered by the QAM optical modulator, and the white area between the dots represents constellation area not covered by the QAM optical modulator. The red dots (e.g., 391) on each diagram (e.g., 310) represent theoretical constellation points of a 16-QAM optical signal. As discussed above with respect to FIG. 1, a set of characteristics of the QAM optical modulator are configurable (or reconfigurable, adjustable, tunable). For example, the power splitting ratio (or optical coupling ratio "OCR") of the tunable optical coupler (such as the TOC 104 in FIG. 1), the power coupling ratio of the optical combiner (such as OC 105 in FIG. 1), the number of bits of the DAC that generates the electrical signals that drive phase modulators (such as PM1 and PM2 in FIG. 1), and the phase shift (such as PS 130 in FIG. 1) between a first modulated optical signal (such as 115 in FIG. 1) and a second modulated optical signal (such as 117 in FIG. 1) are reconfigurable.

As shown in FIG. 3, each of the six constellation diagrams, 310-360, represents a 16-QAM constellation diagram generated by the QAM optical modulator with a different set of characteristics of the QAM optical modulator. For example, constellation diagram 310 is simulated with the QAM optical modulator having, 305, an optical coupling ratio ("OCR") of 0.5, driven by a DAC with a number of bits of six, and a phase shift of zero degree. Constellation diagram 320 is simulated with the QAM optical modulator having, 306, an OCR of 0.5, driven by a DAC with a number of bits of six, and a phase shift of fifteen degrees. Constellation diagram 330 is simulated with the QAM optical modulator having, 307, an OCR of 0.5, driven by a DAC with a number of bits of six, and a phase shift of thirty degrees. Constellation diagram 340 is simulated with the QAM optical modulator having, 308, an OCR of 0.4, driven by a DAC with a number of bits of six, and a phase shift of zero degree. Constellation diagram 350 is simulated with the QAM optical modulator having, 309, an OCR of 0.3, driven by a DAC with a number of bits of six, and a phase shift of zero degree. Constellation diagram 360 is simulated with the QAM optical modulator having, 321, an OCR of 0.2, driven by a DAC with a number of bits of six, and a phase shift of zero degree. As shown in FIG. 3, constellation diagrams 320, 330, and 340 have more coverage of constellation points than the other three constellation diagrams 310, 350, and 360. Therefore, during a design process, a manufacturing process, a reconfiguration process, a troubleshoot process, or in operation of the QAM optical modulator to produce a 16-QAM optical signal, a set of characteristics of the QAM optical modulator can be dynamically chosen to be similar to the characteristics (306, 307, and 308) associated with constellation diagrams 320, 330, and 340. In other words, by dynamically configuring the OCR, the power coupling ratio of the OC, the number of bits of the DAC, and the phase shift of a QAM optical modulator, at any given time from a design and manufacturing process to when the QAM optical modulator is in operation, the coverage of the constellation diagram by the QAM optical modulator can be adjusted or improved.

Figure 4:
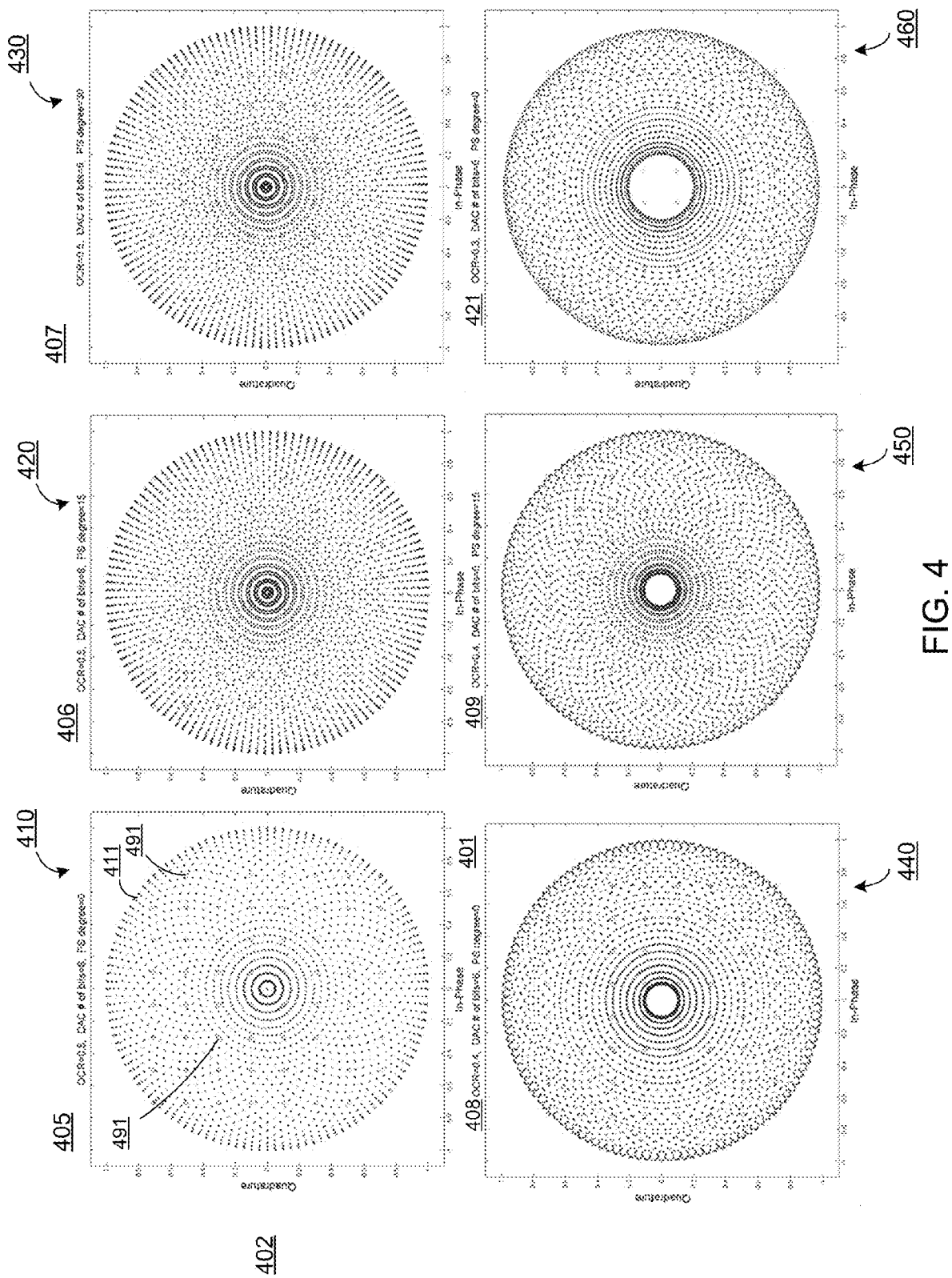
FIG. 4 illustrates constellation diagrams of a 64-QAM optical signal based on simulations of output generated by a QAM optical modulator, according to an embodiment.

FIG. 4 illustrates constellation diagrams of a 64-QAM optical signal based on simulations of output generated by a QAM optical modulator, according to an embodiment. Each of the six constellation diagrams, 410-460, is a simulated constellation diagram of a 64-QAM optical signal generated by a configuration of a QAM optical modulator (such as the QAM optical modulator described with respect to FIG. 1). The horizontal axis (e.g., 401 in diagram 410) of each constellation diagram (e.g., 410) represents an in-phase (I) component of the 64-QAM optical signal, and the vertical axis (e.g., 402 in diagram 410) of the constellation diagram (e.g., 410) represents a quadrature (Q) component of the 64-QAM optical signal. Similar to the constellation diagrams of the 16-QAM optical signal as described with respect to FIG. 3, the blue dots (e.g., 411) on each diagram (e.g., 410) represent simulated constellation points covered by the QAM optical modulator, and the white area between the dots represents constellation area not covered by the QAM optical modulator. The red dots (e.g., 491) on each diagram (e.g., 410) represent theoretical constellation points of a 64-QAM optical signal. As discussed above with respect to FIG. 1 and FIG. 3, a set of characteristics of the QAM optical modulator are configurable (or reconfigurable, adjustable, tunable) and include the power splitting ratio (or optical coupling ratio "OCR") of the tunable optical coupler (such as the TOC 104 in FIG. 1), the power coupling ratio of the optical combiner (such as OC 105 in FIG. 1), the number of bits of the DAC that generates the electrical signals that drive phase modulators (such as PM1 and PM2 in FIG. 1), and the phase shift (such as PS 130 in FIG. 1) between a first modulated optical signal (such as 115 in FIG. 1) and a second modulated optical signal (such as 117 in FIG. 1) are configurable.

As shown in FIG. 4, each of the six constellation diagrams, 410-460, represents a 64-QAM constellation diagram generated by the QAM optical modulator with a different set of characteristics of the QAM optical modulator. For example, constellation diagram 410 is simulated with the QAM optical modulator having, 405, an optical coupling ratio ("OCR") of 0.5, driven by a DAC with a number of bits of six, and a phase shift of zero degree. Constellation diagram 420 is simulated with the QAM optical modulator having, 406, an OCR of 0.5, driven by a DAC with a number of bits of six, and a phase shift of fifteen degrees. Constellation diagram 430 is simulated with the QAM optical modulator having, 407, an OCR of 0.5, driven by a DAC with a number of bits of six, and a phase shift of thirty degrees. Constellation diagram 440 is simulated with the QAM optical modulator having, 408, an OCR of 0.4, driven by a DAC with a number of bits of six, and a phase shift of zero degree. Constellation diagram 450 is simulated with the QAM optical modulator having, 409, an OCR of 0.4, driven by a DAC with a number of bits of six, and a phase shift of fifteen degrees. Constellation diagram 460 is simulated with the QAM optical modulator having, 421, an OCR of 0.3, driven by a DAC with a number of bits of six, and a phase shift of zero degree. As shown in FIG. 4, constellation diagrams 420 and 430 have more coverage of constellation points than the other four constellation diagrams 410, 440, 450, and 460. Therefore, during a design process, a manufacturing process, a reconfiguration process, a troubleshoot process, or in operation of the QAM optical modulator to produce a 64-QAM optical signal, a set of characteristics of the QAM optical modulator can be dynamically chosen to be similar to the characteristics (406 and 407) associated with constellation diagrams 420 and 430. In other words, by dynamically configuring the OCR, the power coupling ratio of the OC, the number of bits of the DAC, and the phase shift of a QAM optical modulator, at any given time from a design and manufacturing process to when the QAM optical modulator is in operation, the coverage of the constellation diagram by the QAM optical modulator can be adjusted or improved.

Figure 5:
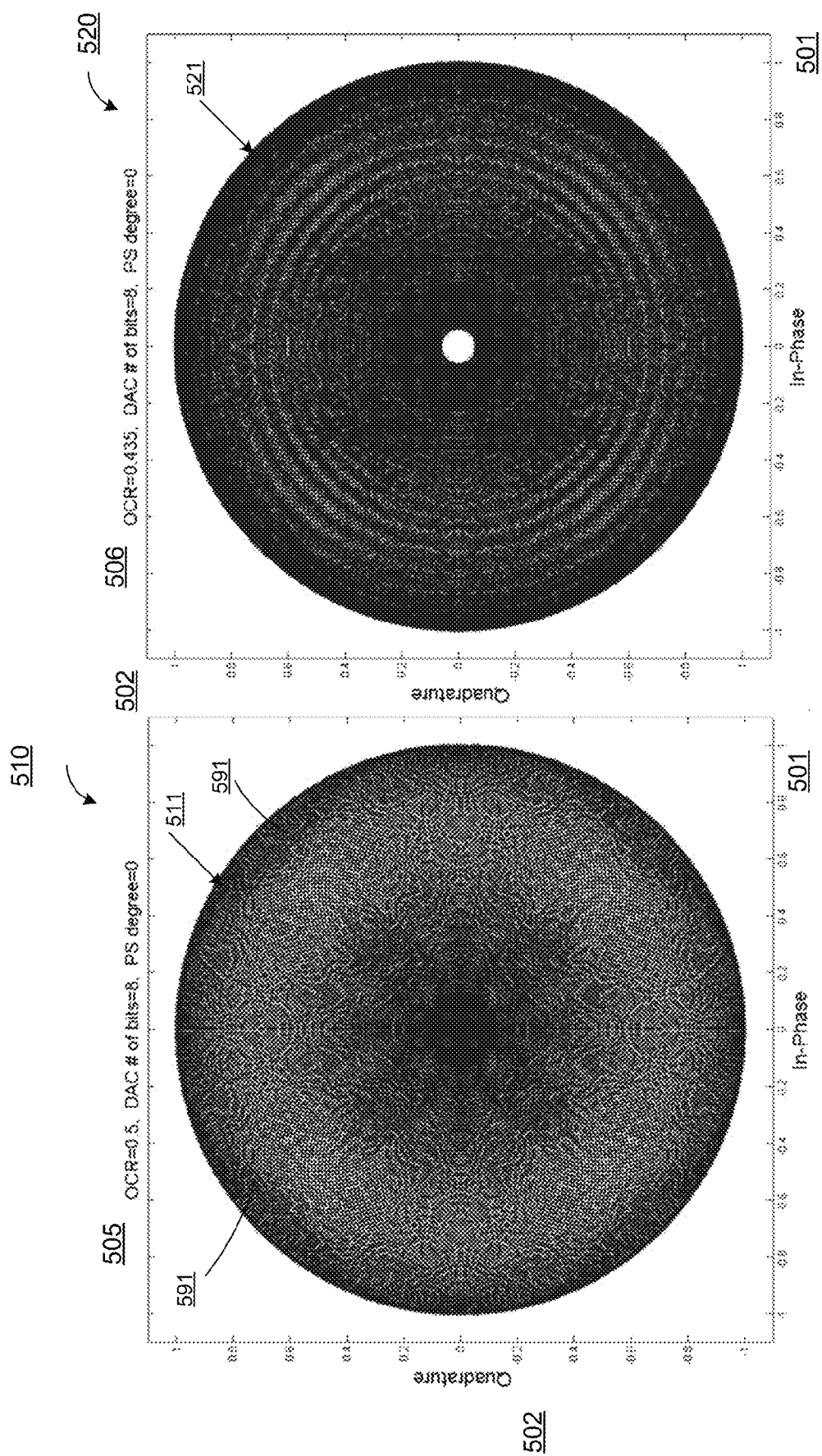
FIG. 5 illustrates constellation diagrams of a 256-QAM optical signal based on simulated output generated by a QAM optical modulator, according to an embodiment.

FIG. 5 illustrates constellation diagrams of a 256-QAM optical signal based on simulated output generated by a QAM optical modulator, according to an embodiment. Each of the two constellation diagrams, 510 and 520, is a simulated constellation diagram of a 256-QAM optical signal generated by a configuration of a QAM optical modulator (such as the QAM optical modulator described with respect to FIG. 1). The horizontal axis, 501, of each constellation diagram represents an in-phase (I) component of the 256-QAM optical signal, and the vertical axis, 502, of the constellation diagram represents a quadrature (Q) component of the 256-QAM optical signal. Similar to the constellation diagrams of the 16-QAM optical signal as described with respect to FIG. 3 and the constellation diagrams of the 64-QAM optical signal as described with respect to FIG. 4, the shaded blue area (e.g., 511 and 521) on each diagram (e.g., 510 and 520) represent simulated constellation points and/or area covered by the QAM optical modulator, and the white area between the dots represents constellation area not covered by the QAM optical modulator. The red dots (e.g., 591) on each diagram (e.g., 510) represent theoretical constellation points of a 256-QAM optical signal.

As shown in FIG. 5, each of the two constellation diagrams, 510 and 520, represents a 256-QAM constellation diagram generated by the QAM optical modulator with a different set of configurable characteristics of the QAM optical modulator. For example, constellation diagram 510 is simulated with the QAM optical modulator having, 505, an optical coupling ratio ("OCR") of 0.5, driven by a DAC with a number of bits of eight, and a phase shift of zero degree. Constellation diagram 520 is simulated with the QAM optical modulator having, 506, an OCR of 0.435, driven by a DAC with a number of bits of eight, and a phase shift of zero degree. As shown in FIG. 5, constellation diagram 520 has more coverage of constellation points 521 than the coverage of constellation points 511 of constellation diagram 510. Therefore, during a design process, a manufacturing process, a reconfiguration process, a troubleshoot process, or in operation of the QAM optical modulator to produce a 256-QAM optical signal, a set of characteristics of the QAM optical modulator can be dynamically chosen to be similar to the characteristics, 506, associated with constellation diagrams 520. In other words, by dynamically configuring the OCR, the power coupling ratio of the OC, the number of bits of the DAC, and the phase shift of a QAM optical modulator, at any given time from a design and manufacturing process to when the QAM optical modulator is in operation, the coverage of the constellation diagram by the QAM optical modulator can be adjusted or improved.

Figure 6:
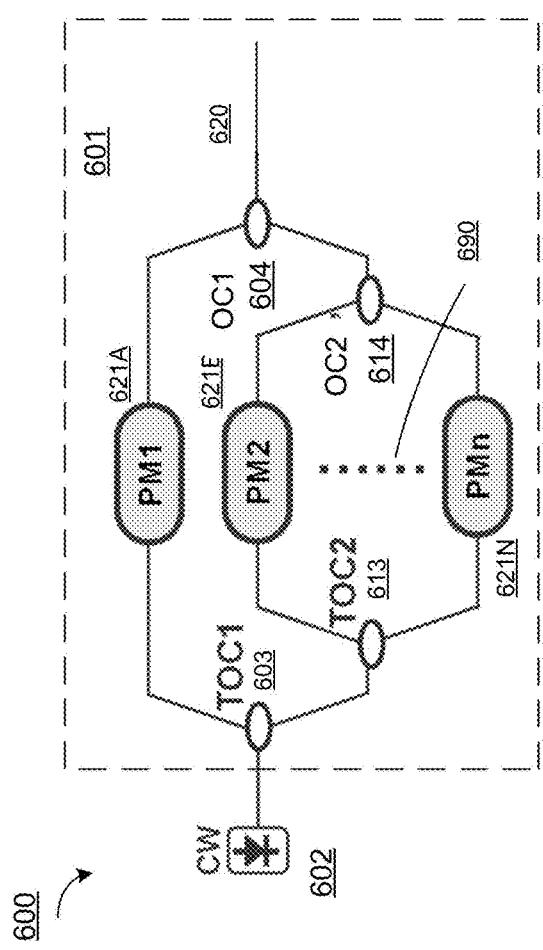
FIG. 6 is a block diagram illustrating a parallel optical signal transmission apparatus configured to generate m-QAM optical signals, according to an embodiment.

FIG. 6 is a block diagram illustrating a parallel optical signal transmission apparatus configured to generate m-QAM optical signals, according to an embodiment. As shown in FIG. 6, the parallel optical signal transmission apparatus 600 includes an optical source 602 and a parallel QAM optical modulator 601 operatively coupled to the optical source 602. The optical source 602 can be, for example, a laser diode emitting an optical signal (or light wave) in a continuous waveform (CW), physically and functionally similar to the optical source 102 in FIG. 1. The optical source 602 outputs the optical signal to the parallel QAM optical modulator 601, which can modulate the optical signal to output an m-QAM optical signal 620 for transmission in an optical communication system (not shown in FIG. 6).

In some implementations, the QAM optical modulator 101 in FIG. 1 includes two phase modulators (PM1, 106, and PM2, 108), each of which is driven by a multi-level electrical signal generated by a multi-bit DAC. For example, in one implementation as described in FIG. 3, to generate a 16-QAM optical signal, each of the two phase modulators in the QAM optical modulator (such as the QAM optical modulator 101 in FIG. 1) can be driven by a DAC with a number of bits of six. Similarly as described in FIG. 4, in one implementation, to generate a 64-QAM optical signal, each of the two phase modulators in the QAM optical modulator (such as the QAM optical modulator 101 in FIG. 1) can be driven by a DAC with a number of bits of six. As described in FIG. 5, in one implementation, to generate a 256-QAM optical signal, each of the two phase modulators in the QAM optical modulator (such as the QAM optical modulator 101 in FIG. 1) can be driven by a DAC with a number of bits of eight. The phase modulators, the TOC, and the OC of the QAM optical modulator 101 described with respect to FIG. 1 can be used as building blocks to provide the parallel QAM optical modulator 601 as described in FIG. 6 and the serial QAM optical modulator 701 as described in FIG. 7.

Returning to FIG. 6, in one implementation, the parallel QAM optical modulator 601 can include more than two phase modulators operatively coupled with each other in parallel, such as N phase modulators (PM1 621A, PM2 621B ... PMn 621N). The ellipses 690 represent that there can be multiple PMs, multiple tunable optical couplers (TOCs), and multiple optical combiners (OCs). Each phase modulator from the set of phase modulators (N phase modulators) can be driven by a multi-level electrical signal (not shown) generated by a multi-bit DAC (not shown). In some implementations, the number of bits of each DAC can be two or four, thus generating a binary or four-level electrical signal, respectively. Therefore, to generate a m-QAM optical signal, instead of having only two phase modulators, each of which is driven by an electrical signal with a higher number of level (e.g., six-level or eight-level electrical signals) as described with respect to FIG. 1, a parallel QAM optical modulator, as described as 601 in FIG. 6, can include more than two phase modulators (e.g., N phase modulators) connected in parallel, each of which is driven by an electrical signal with a lower number of level (e.g., binary or four-level electrical signal).

Specifically, the parallel QAM optical modulator 601 can include a set of phase modulators (e.g., N phase modulators, N is greater than 3), a set of tunable optical couplers (TOCs), and a set of optical combiners (OCs). In some implementations, when the number of phase modulators included in the parallel QAM optical modulator 601 N, the number of TOCs included in the parallel QAM optical modulator 601 can be (N-1), and the number of OCs included in the parallel QAM optical modulator 601 can be (N-1). In one implementation, for example, when N is equal to 3, the parallel QAM optical modulator 601 includes three phase modulators, the first phase modulator PM1 621A, the second modulator PM2 621B, and the $N^{th}$ modulator PMn 621N. The parallel QAM optical modulator 601 can also include a first TOC 603, a second TOC 613, a first OC 604, and a second OC 614. Optionally, the parallel QAM optical modulator 601 can also include a set of phase shifters (PS, not shown in FIG. 6) similar to the phase shifter 130 in FIG. 1.

Each of the three phase modulators (PM1 621A, PM2 621B, PMn 621N) can be similar in structure and function as the phase modulators PM1 and PM2 in FIG. 1. For example, each of the three phase modulators (PM1 621A, PM2 621B, PMn 621N) can be driven by a respective electrical signal and can modulate an optical signal by varying the instantaneous phase of the optical signal. As previously discussed, in one implementation, the electrical signal that drives each of the three phase modulators (PM1 621A, PM2 621B, PMn 621N) can be a lower-level electrical signal (e.g., binary or four-level) generated by a DAC (e.g., 2-bit DAC or 4-bit DAC, not shown in FIG. 6). In another implementation, the electrical signal that drives each of the three phase modulators (PM1 621A, PM2 621B, PMn 621N) can be a higher-level electrical signal (e.g., six-level or eight-level) generated by a DAC (e.g., 6-bit DAC or 8-bit DAC, not shown in FIG. 6). The number of bits of the DAC for each PM (PM1 621A, PM2 621B, PMn 621N) can be the same as or different from the number of bits of the DAC for the other PM (PM1 621A, PM2 621B, PMn 621N).

Each of the two TOCs, 603 and 613, can be similar in structure and function as the TOC 104 in FIG. 1. Each of the OCs, 604 and 614, can be similar in structure and function as the OC 105 in FIG. 1. For example a power splitting ratio associated with each of the TOCs, 603 and 613, can be fixed or dynamically tunable during a design process, a manufacturing process, a reconfiguration process, a troubleshoot process, or in operation. Each of the TOCs, 603 and 613, can split an optical signal equally (i.e., 50%) or unequally (i.e., not 50%). Similarly, a power coupling ratio associated with each of the OCs, 604 and 614, can be fixed or dynamically tunable during a design process, a manufacturing process, a reconfiguration process, a troubleshoot process, or in operation. Each of the OCs, 604 and 614, can combine two optical signals equally (i.e., 50%) or unequally (i.e., not 50%). As discussed above with respect to FIGS. 3-5, the characteristics of each component of the parallel QAM optical modulator 601 are reconfigurable. For example, the power splitting ratio of each TOCs, 603 and 613, the power coupling ratio of each of the OCs, 604 and 614, the number of bits of each DAC that drives each PM (PM1 621A, PM2 621B, PMn 621N), and the phase shift of each PS (not shown in FIG. 6) are reconfigurable.

In use, the optical source 602 can output an optical signal to the TOC1 603 of the parallel QAM optical modulator 601. The TOC1 603 can split the optical signal to a first split optical signal and a second split optical signal according to a power splitting ratio. The first split optical signal is output to the first PM, PM1 621A, and the second split optical signal is output to the second TOC, TOC2 613. The first PM, PM1 621A, then receives the first split optical signal and modulates the first split optical signal to produce a first modulated optical signal, in response to a multi-level electrical signal produced by a multi-bit DAC (not shown in FIG. 6). PM1 621A can output the first modulated optical signal to the first OC 604.

Upon receiving the second split optical signal, the second TOC, TOC2 613, can split the second split optical signal to produce a third split optical signal and a fourth split optical signal according to a power splitting ratio. TOC2 613 can output the third split optical signal to PM2 621B and output the fourth split optical signal to PMn 621N. PM2 621B then receives the third split optical signal and modulates the third split optical signal to produce a second modulated optical signal, in response to a multi-level electrical signal produced by a multi-bit DAC (not shown in FIG. 6). PM2 621B can output the second modulated optical signal to the second OC 614.

In one implementation, PMn 621N then receives the fourth split optical signal and modulates the fourth split optical signal to produce a third modulated optical signal, in response to a multi-level electrical signal produced by a multi-bit DAC (not shown in FIG. 6). PMn 621N can also output the third modulated optical signal to the second OC 614. Upon receiving the second modulated optical signal and the third modulated optical signal, the second OC 614 can combine the second modulated optical signal and the third modulated optical signal to produce a combined optical signal according to a power coupling ratio, and output the combined optical signal to the first OC 604. Upon receiving the combined optical signal from the second OC 614 and the first modulated optical signal from PM1 621A, the first OC 604 combines the two signals, according to a power coupling ratio, to produce and output a modulated QAM optical signal 620.

Figure 7:
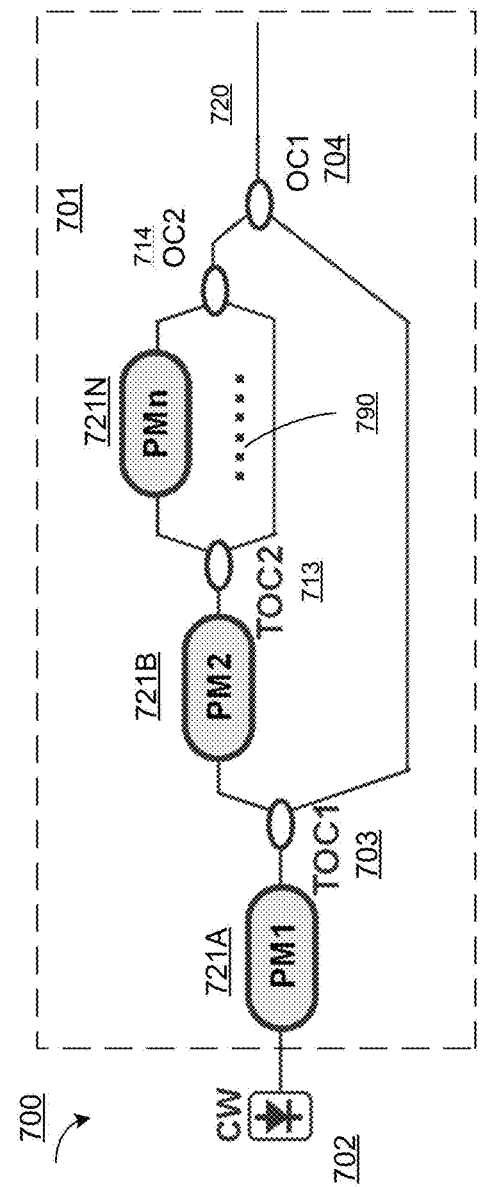
FIG. 7 is a block diagram illustrating a serial optical signal transmission apparatus configured to generate m-QAM optical signals, according to an embodiment.

FIG. 7 is a block diagram illustrating a serial optical signal transmission apparatus configured to generate m-QAM optical signals, according to an embodiment. In some embodiments, similar to the parallel optical signal transmission apparatus 600 described with respect to FIG. 6, the serial optical signal transmission apparatus 700 includes an optical source 702 and a serial QAM optical modulator 701 operatively coupled to the optical source 702. The optical source 702 can be, for example, a laser diode emitting an optical signal (or light wave) in a continuous waveform (CW), physically and functionally similar to the optical source 102 in FIG. 1. The optical source 702 outputs the optical signal to the serial QAM optical modulator 701, which can modulate the optical signal to output an m-QAM optical signal 720 for transmission in an optical communication system (not shown in FIG. 7).

Similar to the discussions above with regards to the comparison between the embodiments described in FIG. 6 and the embodiments described in FIG. 1, in some implementations, the serial QAM optical modulator 701 can include more than two phase modulators operatively coupled with each other in serial, such as N phase modulators (PM1 721A, PM2 721B . . . PMn 721N). The ellipses 790 represent that there can be multiple PMs, multiple tunable optical couplers (TOCs), and multiple optical combiners (OCs). Each phase modulator from the set of phase modulators (N phase modulators) can be driven by a multi-level electrical signal (not shown) generated by a multi-bit DAC (not shown). In some implementations, the number of bits of each DAC can be two or four, thus generating a binary or four-level electrical signal, respectively. Therefore, to generate a m-QAM optical signal, instead of having only two phase modulators, each of which is driven by an electrical signal with a higher number of level (e.g., six-level or eight-level electrical signals) as described with respect to FIG. 1, a serial QAM optical modulator, as described as 701 in FIG. 7, can include more than two phase modulators (e.g., N phase modulators) connected in serial, each of which is driven by an electrical signal with a lower number of level (e.g., binary or four-level electrical signal).

Specifically, the serial QAM optical modulator 701 can include a set of phase modulators (e.g., N phase modulators, N is greater than 3.), a set of tunable optical couplers (TOCs), and a set of optical combiners (OCs). In some implementations, when the number of phase modulators included in the parallel QAM optical modulator 601 is N, the number of TOCs included in the parallel QAM optical modulator 601 can be (N-1), and the number of OCs included in the parallel QAM optical modulator 601 can be (N-1). In one implementation, for example, when N is equal to 3, the serial QAM optical modulator 701 includes three phase modulators, the first phase modulator PM1 721A, the second modulator PM2 721B, and the third modulator PMn, 721N). The serial QAM optical modulator 701 can also include a first TOC 703, a second TOC 713, a first OC 704, and a second OC 714. Optionally, the serial QAM optical modulator 701 can also include a set of phase shifters (PS, not shown in FIG. 7) such as the phase shifter 130 in FIG. 1.

Each of the three phase modulators (PM1 721A, PM2 721B, PMn 721N) can be similar in structure and function as the phase modulators PM1 and PM2 in FIG. 1. For example, each of the three phase modulators (PM1 721A, PM2 721B, PMn 721N) can be driven by a respective electrical signal and can modulate an optical signal by varying the instantaneous phase of the optical signal. As previously discussed, in one implementation, the electrical signal that drives each of the three phase modulators (PM1 721A, PM2 721B, PMn 721N) can be a lower-level electrical signal (e.g., binary or four-level) generated by a DAC (e.g., 2-bit DAC or 4-bit DAC, not shown in FIG. 7). In another implementation, the electrical signal that drives each of the three phase modulators (PM1 721A, PM2 721B, PMn 721N) can be a higher-level electrical signal (e.g., six-level or eight-level) generated by a DAC (e.g., 7-bit DAC or 8-bit DAC, not shown in FIG. 7). The number of bits of the DAC for each PM (PM1 721A, PM2 721B, PMn 721N) can be the same as or different from the number of bits of the DAC for the other PM (PM1 721A, PM2 721B, PMn 721N).

Each of the two TOCs, 703 and 713, can be similar in structure and function as the TOC 104 in FIG. 1. Each of the OCs, 704 and 714, can be similar in structure and function as the OC 105 in FIG. 1. For example a power splitting ratio associated with each of the TOCs, 703 and 713, can be fixed or dynamically tunable during a design process, a manufacturing process, a reconfiguration process, a troubleshoot process, or in operation. Each of the TOCs, 703 and 713, can split an optical signal equally (i.e., 50%) or unequally (i.e., not 50%). Similarly, a power coupling ratio associated with each of the OCs, 704 and 714, can be fixed or dynamically tunable during a design process, a manufacturing process, a reconfiguration process, a troubleshoot process, or in operation. Each of the OCs, 704 and 714, can combine two optical signals equally (i.e., 50%) or unequally (i.e., not 50%). As discussed above with respect to FIGS. 3-5, the characteristics of each component of the serial QAM optical modulator 701 are reconfigurable. For example, the power splitting ratio of each TOCs, 703 and 713, the power coupling ratio of each of the OCs, 704 and 714, the number of bits of each DAC that drives each PM (PM1 721A, PM2 721B, PMn 721N), and the phase shift of each PS (not shown in FIG. 7) are reconfigurable.

In use, the optical source 702 can output an optical signal to PM1 721A of the serial QAM optical modulator 701. Upon receiving the optical signal from the optical source 702, PM1 721A can modulate the optical signal by applying a multi-level electrical signal produced by a multi-bit DAC (not shown in FIG. 7) to produce a first modulated optical signal. PM1 721A can then output the first modulated optical signal to TOC1 703. TOC1 703 can split the first modulated optical signal to a first split optical signal and a second split optical signal according to a power splitting ratio. The first split optical signal is output to PM2 721B, and the second split optical signal is output to the first OC, OC1 704.

Upon receiving the first split optical signal, PM2 721B can then modulate the first split optical signal by applying a multi-level electrical signal produced by a multi-bit DAC (not shown in FIG. 7) to produce a second modulated optical signal. PM2 721B can then output the second modulated optical signal to TOC2 713. TOC2 713 can split the second modulated optical signal to a third split optical signal and a fourth split optical signal according to a power splitting ratio. The third split optical signal is output to PMn 721N, and the fourth split optical signal is output to the second OC, OC2 714.

Upon receiving the third split optical signal, PMn 721N can then modulate the third split optical signal by applying a multi-level electrical signal produced by a multi-bit DAC (not shown in FIG. 7) to produce a third modulated optical signal. PM2 721B can then output the third modulated optical signal to OC2 714. OC2 714 combines the fourth split optical signal and the third modulated optical signal, according to a power coupling ratio, to produce a first combined optical signal. OC2 714 outputs the first combine optical signal to OC1 704. Upon receiving the first split optical signal from TOC1 703 and the first combined optical signal from OC2 714, OC1 704 can combine the two signals to produce a modulated QAM optical signal 720.

FIG. 8 is a flow chart illustrating a method of generating a QAM optical signal with a QAM optical modulator having two phase modulators, according to an embodiment. This method 800 can be implemented at a QAM optical modulator (e.g., QAM optical modulator 101 in FIG. 1). The QAM optical modulator, which is operatively coupled to an optical source, includes a tunable optical coupler (TOC), a first phase modulator (PM) a second phase modulator (PM), and an optical combiner (OC). The QAM optical modulator can optically include a phase shifter (PS) in some implementations. The method includes receiving an optical signal at the TOC of the QAM optical modulator from the optical source at 802. The TOC then splits the optical signal, according to a first power splitting ratio, to produce a first split optical signal and a second split optical signal. In some implementations, the TOC can split the optical signal equally, and thus the first power splitting ratio is 0.5. In other implementations, the TOC can split the optical signal unequally. The first power splitting ratio can also be tunable or fixed.

At 804, the TOC outputs the first split optical signal to the first PM and the second split optical signal to the second PM. Upon receiving the first split optical signal, the first PM modulates the first split optical signal by applying a multi-level electrical signal generated by a first multi-bit DAC and produces a first modulated optical signal. The first PM then outputs the first modulated optical signal to the OC. The instantaneous phase of the first split optical signal is varied when the first PM is driven by the first multi-level electrical signal. The first modulated optical signal can be represented as covering a first set of constellation points on a circle in a constellation diagram of the QAM optical signal.

At 806, upon receiving the second split optical signal, the second PM modulates the second split optical signal by applying a multi-level electrical signal generated by a second multi-bit DAC and produces a second modulated optical signal. The second PM then outputs the second modulated optical signal to the OC. The instantaneous phase of the second split optical signal is varied when the second PM is driven by the second multi-level electrical signal. The number of bits of the first DAC can be the same as or different from the number of bits of the second DAC. For example, the first DAC, which is operatively coupled to the first PM, can have a number of bits of six to generate a 16-QAM optical signal. The second DAC, which is operatively coupled to the second PM, can have a number of bits of six or eight. The second modulated optical signal can be represented within the constellation diagram as starting from a point on the circle covered by the first modulated optical signal and covering a second set of constellation points. The first set of constellation points and the second set of constellation points represent all constellation points of a QAM optical signal.

In some embodiments, a phase shifter (PS) can be optionally coupled to second PM and the OC. Specifically, the PS receives the second modulated optical signal from the second PM and applies a phase rotation to the second modulated optical signal to produce a third modulated optical signal. PS, driven by a control signal, can cause a phase offset between the first modulated optical signal and the third modulated optical signal. In some implementations, the degree of the phase offset can be dynamically adjusted (or reconfigured) to any number between 0 and 90 degrees. In some implementations as shown in FIG. 1, the PS is operatively coupled to the output of second PM and the output of PS is operatively coupled to the input of OC. In other implementations, the PS can be positioned before or after each of the first PM and the second PM. For example, the PS can be operatively coupled to the output of the TOC and the output of the PS can be operatively coupled to the input of second PM. As discussed earlier, PS is optional and thus in some embodiments, the QAM optical modulator does not include a phase shifter.

At 808, when receiving the first modulated optical signal from the first PM and the second modulated optical signal from the second PM, the OC combines the first modulated optical signal and the second modulated optical signal, according to a power coupling ratio, to output a QAM optical signal. In some implementations, the OC can combine the first modulated optical signal and the second modulated optical signal equally, and thus the power coupling ratio is 0.5. In other implementations, the OC can combine the first modulated optical signal and the second modulated optical signal unequally. The power coupling ratio can also be dynamically tunable or fixed. In some implementations, the power coupling ratio of the OC can be the same as the power splitting ratio of the TOC. In other implementations, the power coupling ratio of the OC can be different (or unbalanced) from the power splitting ratio of the TOC. Therefore, during a design process, a manufacturing process, a reconfiguration process, a troubleshoot process, or in operation of the QAM optical modulator to produce a QAM optical signal, a set of characteristics of the QAM optical modulator can be dynamically chosen to be similar to the characteristics associated with simulated constellation diagrams that have higher coverage by the constellation points. In other words, by dynamically configuring the OCR, the number of bits of the DAC, the power coupling ratio of the OC, and the phase shift of a QAM optical modulator, at any given time from a design and manufacturing process to when the QAM optical modulator is in operation, the coverage of the constellation diagram by the QAM optical modulator can be adjusted or improved.

In some implementations, a set of characteristics of the QAM optical modulator are configurable (or reconfigurable, adjustable, tunable). For example, the power splitting ratio (or optical coupling ratio "OCR") of the TOC, the power coupling ratio of the optical combiner, the number of bits of the DAC which generates the electrical signals that drive phase modulators, and the phase shift are reconfigurable.

FIG. 9 is a flow chart illustrating a method of generating a QAM signal with a parallel or serial QAM optical modulator having three or more phase modulators, according to an embodiment. The method 900 can be implemented in a parallel QAM optical modulator (e.g., parallel QAM optical modulator 601 in FIG. 6) or a serial QAM optical modulator (e.g., serial QAM optical modulator 701 in FIG. 7). The parallel or serial QAM optical modulator, which is operatively coupled to an optical source, includes three or more phase modulators, two or more TOCs, two or more OCs, and optional phase shifters.

At 902, the parallel or serial QAM optical modulator receives an optical signal from the optical source and splits the optical signal to produce a set of split optical signals. At 904, each PM from the set of PMs modulates a split optical signal by applying a multi-level electrical signal to produce a set of modulated optical signals. At 906, the set of OCs combines the set of modulated optical signals to output a modulated QAM optical signal. In some implementations, the number of bits of each DAC can be two or four, thus generating a binary or four-level electrical signal, respectively. Therefore, to generate a m-QAM optical signal, the parallel or serial QAM optical modulator, as described as 601 in FIGS. 6 and 701 in FIG. 7, can include three or more phase modulators (e.g., N phase modulators) connected in parallel or serial, each of which is driven by an electrical signal with a lower number of level (e.g., binary or four-level electrical signal).

Some embodiments described herein relate to a system including a processor. The processor can include one or more modules configured to perform different functions associated with generating a QAM optical signal, including, but not limited to, performing dynamic adjustment of power splitting ratios of tunable optical couplers, power coupling ratios of optical combiners, a number of bits of DACs, and a phase shift of a QAM optical modulator. In some embodiments, the processor can generate and/or transmit control signals and/or modulation signals. In some embodiments, the control signals can be associated with a phase shifter (PS) to adjust the degree of the phase shift between two optical signals. In some embodiments, the control signals can be associated with configuring for a particular M-ary value. In some embodiments, the module(s) included in the processor can be a hardware-based module (e.g., an ASIC, a DSP, a FPGA), a software-based module (e.g., a module of computer code executed at a processor, a set of processor-readable instructions executed at a processor), and/or a combination of hardware- and software-based modules. Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a serial quadrature amplitude modulation (QAM) optical modulator including a first phase modulator (PM), a first tunable optical coupler (TOC), a second PM, a second TOC, a third PM, a first optical combiner (OC), and a second optical combiner (OC),
the first PM, operatively coupled to an input of the first TOC, configured to modulate an input optical signal in response to a first multi-level electrical signal to produce a first modulated optical signal,
the first TOC having a first output operatively coupled to the second PM and a second output operatively coupled to the first OC,
the second PM operatively coupled to an input of the second TOC,
the second TOC having a first output operatively coupled to the third PM and a second output operatively coupled to the second OC,
the third PM operatively coupled to an input of the second OC, an output of the second OC coupled to a first input of the first OC,
the first OC configured to output a modulated QAM optical signal.

2. The apparatus of claim 1, wherein:
the first PM is configured to modulate the input optical signal to produce a first modulated optical signal,
the first TOC is configured to split the first modulated optical signal to produce a first split optical signal and a second split optical signal,
the second PM is configured to modulate the first split optical signal to produce a second modulated optical signal,
the second TOC is configured to split the second modulated optical signal to produce a third split optical signal and a fourth split optical signal,
the third PM is configured to modulate the third split optical signal to produce a third modulated optical signal,
the second OC is configured to combine the third modulated optical signal and the fourth split optical signal to produce a first combined optical signal, and
the first OC is configured to combine the first combined optical signal with the second split optical signal to produce the modulated QAM optical signal.

3. An apparatus, comprising:
a serial quadrature amplitude modulation (QAM) optical modulator including a first phase modulator (PM), a first tunable optical coupler (TOC), a second PM, a second TOC, a third PM, a first optical combiner (OC), and a second optical combiner (OC),
the first PM, operatively coupled to the first TOC, configured to modulate an input optical signal in response to a first multi-level electrical signal to produce a first modulated optical signal,
the first TOC configured to split the first modulated optical signal to produce a first optical signal and a second optical signal,
the second PM configured to modulate the first split optical signal in response to a second multi-level electrical signal to produce a second modulated optical signal,
the second TOC configured to split the second modulated optical signal to produce a third split optical signal and a fourth split optical signal,
the third PM configured to modulate the third split optical signal in response to a third multi-level electrical signal to produce a third modulated optical signal,
the second OC configured to combine the third modulated optical signal and the fourth split optical signal to produce a first combined optical signal,
the first OC configured to combine the first combined optical signal and the second split optical signal to generate a QAM optical signal.

4. The apparatus of claim 3, wherein:
the serial QAM optical modulator includes a plurality of phase modulators connected in series.

5. The apparatus of claim 3, wherein:
the serial QAM optical modulator includes a set of phase shifters configured to shift a phase of one or more of the first modulated optical signal, the second modulated optical signal, or the third modulated optical signal.

6. The apparatus of claim 5, wherein the phase of one or more of the first modulated optical signal, the second modulated optical signal, or the third modulated optical signal shifted by the set of phase shifters is configurable.

7. The apparatus of claim 3, wherein:
the first TOC is configured to split the first modulated optical signal at an adjustable power splitting ratio to produce the first optical signal and the second optical signal.

8. The apparatus of claim 3, wherein:
the first OC is configured to combine the first combined optical signal and the second split optical signal at an adjustable coupling ratio.

9. The apparatus of claim 3, wherein:
the first PM is configured to modulate the input optical signal to produce the first modulated optical signal such that the first modulated optical signal is represented within a constellation diagram as covering a first plurality of constellation points on a circle,
the second PM is configured to modulate the first split optical signal to produce the second modulated optical signal such that the second modulated optical signal is represented within the constellation diagram as starting from a point on the circle and covering a second plurality of constellation points,
the third PM is configured to modulate the third split optical signal to produce the third modulated optical signal such that the third modulated optical signal is represented within the constellation diagram as starting from one of the second plurality of constellation points, and covering a third plurality of constellation points, and
a vector addition of the first plurality of constellation points, the second plurality of constellation points and the third plurality of constellation points collectively represents the QAM optical signal.

10. The apparatus of claim 3, wherein the QAM optical signal is one of a 16-QAM optical signal, a 64-QAM optical signal, or a 256-QAM optical signal.

11. The apparatus of claim 3, wherein a number of bits of the second multi-level electrical signal equals a number of bits of the first multi-level electrical signal.

12. The apparatus of claim 3, wherein a number of bits of the second multi-level electrical signal differs from a number of bits of the first multi-level electrical signal.

13. The apparatus of claim 3, wherein the serial QAM optical modulator is configured to be operatively coupled to a digital-to-analog converter that generates the first multi-level electrical signal.

14. The apparatus of claim 13, wherein a number of bits associated with the digital-to-analog converter is configurable.

15. A method, comprising:
modulating an input optical signal in response to a first multi-level electrical signal to produce a first modulated optical signal;
splitting the first modulated optical signal to produce a first split optical signal and a second split optical signal;
modulating the first split optical signal in response to a second multi-level electrical signal to produce a second modulated optical signal;
splitting the second modulated optical signal to produce a third split optical signal and a fourth split optical signal;
modulating the third split optical signal in response to a third multi-level electrical signal to produce a third modulated optical signal;
combining the third modulated optical signal and the fourth split optical signal to produce a first combined optical signal; and
combining the first combined optical signal and the second split optical signal to generate a QAM optical signal.

16. The method of claim 15, wherein:
the modulating the input optical signal, the modulating the first split optical signal, and the modulating the third split optical signal are performed in a serial order.

17. The method of claim 15, further comprising:
shifting a phase of one or more of the first modulated optical signal, the second modulated optical signal, or the third modulated optical signal.

18. The method of claim 17, wherein the phase of one or more of the first modulated optical signal, the second modulated optical signal, or the third modulated optical signal is configurable.

19. The method of claim 15, further comprising:
splitting the first modulated optical signal at an adjustable power splitting ratio to produce the first split optical signal and the second split optical signal.

20. The method of claim 15, further comprising:
combining the first combined optical signal and the second split optical signal at an adjustable coupling ratio.

* * * * *